United States Patent
Orgelmacher

Patent Number: 5,619,907
Date of Patent: Apr. 15, 1997

[54] CONTACT GRILL APPARATUS

[75] Inventor: Friedhelm Orgelmacher, Soest, Germany

[73] Assignee: H. H. Scholz KG, Hamburg, Germany

[21] Appl. No.: 368,959

[22] Filed: Jan. 5, 1995

[30] Foreign Application Priority Data

Jan. 8, 1994 [DE] Germany ............................ 9488467 U

[51] Int. Cl.⁶ ...................................................... A47J 37/06
[52] U.S. Cl. .................... 99/351; 99/377; 99/378; 99/379
[58] Field of Search ............................ 99/349, 351, 377, 99/378, 379, 380, 372; 100/233, 293

[56] References Cited

U.S. PATENT DOCUMENTS

| | | | |
|---|---|---|---|
| 1,989,287 | 1/1935 | Parr | 99/349 |
| 2,009,791 | 7/1935 | Shroyer | 99/379 |
| 2,587,314 | 2/1952 | Hall . | |
| 2,915,397 | 12/1959 | Telkes | 99/378 |
| 4,088,067 | 5/1978 | Kaebitzsch et al. | 99/379 |
| 4,204,607 | 5/1980 | Zani . | |
| 4,206,345 | 6/1980 | Maass et al. | 99/374 |
| 4,270,067 | 5/1981 | Thomas et al. | 99/425 |
| 4,364,308 | 12/1982 | John et al. | 99/372 |
| 4,913,040 | 4/1990 | Sherman et al. | 99/372 |
| 5,247,874 | 9/1993 | George, II et al. | 99/377 X |
| 5,423,253 | 6/1995 | Olson et al. | 99/351 |

FOREIGN PATENT DOCUMENTS

| | | |
|---|---|---|
| 0307555 | 3/1989 | European Pat. Off. . |
| 961371 | 4/1957 | Germany . |
| 7419406 | 6/1974 | Germany . |
| 2550703 | 3/1977 | Germany . |
| 7834532 | 11/1978 | Germany . |
| 3620724 | 3/1987 | Germany . |
| 3633394 | 4/1987 | Germany . |
| 3716966 | 12/1988 | Germany . |

*Primary Examiner*—David Scherbel
*Assistant Examiner*—Reginald L. Alexander
*Attorney, Agent, or Firm*—Fay, Sharpe, Beall, Fagan, Minnich & McKee

[57] ABSTRACT

A contact grill apparatus, having at least two grill plates for laying on the food to be grilled, is designed to be particularly effective and efficient in use and easy to handle and operate. At least one of the grill plates is formed in the manner of a sandwich plate and comprises an aluminium core having at least one layer of high-grade steel on the side of the plate facing towards the food. The resulting grill surface thus has both a hard surface constitution and smoothness allowing easy cleaning, while the grill plate itself has excellent heat distribution properties.

25 Claims, 3 Drawing Sheets

FIG. 1

CONTACT GRILL APPARATUS

BACKGROUND OF THE INVENTION

1. Field of the Invention

The invention concerns an electrical contact grill apparatus comprising at least two contact plates to be placed against the food to be grilled.

2. Prior Art

Contact grill devices of this type are well known in practice and give satisfactory results with respect to their performance, energy consumption and efficiency e.g. in the preparation of grilled food. The contact plates themselves are in general formed from metal or glass plates, the employment of these materials representing a compromise between satisfactory heat conduction and a sufficiently hard surface structure for the required frequent cleaning of the plates. Although it is generally known that for example aluminium provides better heat conduction than metal alloys, the cleaning of a contact grill plate made exclusively of aluminium is not possible to a satisfactory extent, because the durability and lifespan of such a contact plate having a relatively soft surface would be severely limited. In addition, known contact grill devices are often not satisfactory with respect to the ease with which they may be handled with regard to their being charged with food, their cleaning etc.

3. Objects of the Invention

In view of the above, it is a main object of the invention to achieve a contact grill apparatus which alleviates the drawbacks and shortcomings of such prior art apparatus.

In particular, it is an important object of the present invention to suggest a grill apparatus which provides an improvement in performance over conventional apparatus.

It is a further object of the invention to propose a contact grill apparatus which provides improved effectiveness with respect to conventional grill apparatus.

It is still a further object of the invention to provide a contact grill apparatus which is particularly easy and expedient to handle and operate.

SUMMARY OF THE INVENTION

In an electrical contact grill apparatus comprising at least two contact plates to be placed on the food to be grilled, these and other objects are achieved by providing at least one contact plate formed in the manner of a sandwich plate, such that it comprises an aluminium core and an external high-grade steel layer. In this structure, the high-grade steel layer is arranged at least on the side of the grill plate directed towards the food to be grilled or the grill area. Besides providing both a hard and smooth surface structure, a contact grill plate for an electric contact grill of this type has the essential feature of excellent heat distribution or conduction, in addition to which heat radiation from the contact grill apparatus when open is low, as the heat is reflected by the high-grade steel layer into the aluminium core. The working conditions for the operator are thereby improved. Due to the high-grade steel layer, the frequent cleaning required in practice causes essentially no wear of the contact plate or its surface. With the contact plates according to the invention, a high rate of preparation of grilled food can be achieved with a relatively low energy consumption as a result of the good heat conduction properties, so that even deep frozen food may be grilled in a relatively short period of time. Moreover, it is possible to design the contact plates themselves to be relatively thin, as the deformation of the plate when heating-up is reduced compared to conventional contact plates. The contact plate according to the invention thus demonstrates a short heating-up time, which results in high energy efficiency being achieved.

A contact plate that is particularly easy to produce can be achieved according to another aspect of the invention by roller-plating the high grade steel layer onto the aluminium core.

In order facilitate handling of the contact grill apparatus, the apparatus may comprise an upper contact plate arranged to pivot on a central arm relative to a fixed lower contact plate. By means of the arrangement of the pivotable contact plate on a central arm, the operability and the material costs of the apparatus are greatly improved in relation to conventional contact grill apparatus having two side arms, and furthermore sufficient stability and robustness are simultaneously safeguarded.

The upper contact plate can advantageously be floatingly arranged, i.e. movably mounted on or in the central arm.

Such an arrangement is particularly favorable to achieve and produce when formed as a universal joint cooperatively associated with the central arm. Due to the floating mounting, an equal distribution of pressure on the food to be grilled can be achieved, even when the food pieces are not all of the same thickness.

In order to reduce the load applied to the food for grilling by the upper contact plate, and so achieve a particularly gentle cooking process, the upper plate may comprise a load or weight relieving device. This also facilitates the easy opening of the upper contact plate with little exertion of force. In addition, the use of a load relieving device allows the fully open upper contact plate to be held or fixed in a substantially vertical position, so that it will not automatically fall shut, and furthermore, remains such as fat or the like can run down the upper plate onto the lower plate so that soiling of the area outside the plates does not occur. In addition to this, an adjustable load relieving device may be arranged in a non-pivotable, fixed portion of the central arm and act upon the pivotable contact plate so as to relieve the load.

An adjustable load relieving device may also be arranged in a pivotable portion of the central arm and act upon the pivotable contact plate so as to relieve the load. By integrating the load relieving device in the central arm, further structural components which would increase the dimensions of the contact grill apparatus are also avoided.

To obtain load relieving devices that are particularly easy and practical to produce, these may be provided in the form of components acting to relieve the load on the upper contact plate by means of at least one compression spring, respectively. The use of compression springs is particularly cost-saving and they have a low susceptibility to failure and are very robust.

In order to ensure a very effective and also robust load relieving device with low production costs, the load relieving device arranged in the fixed central arm portion can be formed as a coupler or movement transmission mechanism in the manner of a set or arrangement of coupled transmission elements including levers.

A lightening or relieving of the load which has a particularly reliable function and satisfies all practical demands made on it is achieved when the load relieving device arranged in the fixed, non-pivotable central arm includes at least one lever arm, which is fixed to, and turns with the pivot axle of the central arm, and the end of the lever located distal from the pivot axis acts in cooperation with a bolt, the bolt being mounted in a frame which in turn is hingedly arranged in a base frame of the central arm, and wherein a compression spring is arranged between a central piece of the frame and a nut arranged at the opposite end of the bolt to the lever. Preferably, two bolts arranged as a pair are provided, whereby each acts together with a spring and a lever, respectively.

Advantageously, each lever arm may be cranked to ensure a particularly favorable application of force for the relieving of load in all possible positions of the upper contact plate.

In order to attain a non-linear load relieving the work arms resulting from the cranked form of the lever arm may have different lengths. The effective load relieving is thereby somewhat reduced, when the shorter arms of the lever arms are used as work arms for the load relieving springs when the upper contact plate is closed. In this way, a predetermined portion of the upper contact plate can lie on the food to be grilled and act on this food according to the requirements of the cooking process. The longer work arms function as work arms when the upper contact plate is open, thereby facilitating the opening and holding open of the plate.

The load relieving device located in the pivotable portion of the central arm may be formed as a rod, mounted in the base frame of the fixed central arm portion but ouside the pivot axis of the central arm, with a sliding element slidingly arranged on the rod and connected to an adjustment button or knob of the central arm, and with the compression spring mounted between the sliding element and a stop member arranged at a free end of the rod. The sliding element may be connected to the adjustment button outside the central axis of the latter, so that the sliding element is displaced upon adjusting the knob. In this way, a further and additional, reliably functioning load relieving device is obtained, wherein the effective load-lightening can be set and controlled independently of the load relieving device arranged in the fixed central arm, and thus be adapted to meet the various requirements arising in practice. In this way, food to be cooked having different heights can be prepared in batches while maintaining sufficient contact with the plates.

The contact grill apparatus can include a stop limiter for defining the minimum distance between contact plates. The stop limiter may be adjustable, i.e. allow the height adjustment of the possible minimum distance between contact plates.

The stop limiter can be arranged in the pivotable portion of the central arm. It may also be formed as a rod mounted in the base frame of the fixed central arm portion outside the pivot axis of the central arm, with a sliding element being slidingly mounted on the rod and connected to a further adjustment knob of the central arm, and a spring mounted in a bushing being arranged between the sliding element and an end piece arranged at a free end of the rod.

To avoid the destruction of components when applying force on the contact plates when these are closed as far as the operative stop limiter, the bushing can be formed such that it defines the longitudinal extension of the spring by means of spring mounts displaceably located in its interior.

In order to extend the apparatus' areas of utilization and application and the modifications possible for satisfying practical requirements, the contact grill device according to the invention may be constructed in a modular form.

In order to meet the requirements of a particularly rapid mass production of food to be cooked, the contact grill apparatus can comprise an upper contact plate, which is laterally displaceable with respect to the base plate, i.e. the effective surface area of the lower contact plate may be larger than that of the upper contact plate, which results in the charging operation being effectively improved and also allows the contact grill apparatus according to the invention to be used for other modes of cooking, such as frying in addition to grilling.

The contact grill apparatus according to the invention may advantageously include several upper contact plates, so that the grilling operation may take place in varying cycles.

Grill operations requiring different temperatures can be made possible very simply by forming the individual contact plates to be separately controllable in this respect.

In order to simplify the servicing of the apparatus and to facilitate the access to the important components during assembly, the required electrical circuitry may be arranged in a separate module or structural unit. The module for the circuitry may thus also be arranged outside, i.e. spatially separated from the contact plates. The apparatus can be embodied according to individual customer requirements without great expense.

To improve the control of the contact plate temperatures as well as the repair and service conditions, the contact grill apparatus according to the invention can comprise electronic control. Thus the hitherto employed mechanical sensors, which have a limited lifespan, are not necessary.

To increase still further the possible areas of application, at least one upper contact plate can be formed as a radiation plate for non-contact or surface grilling or keeping food warm.

BRIEF DESCRIPTION OF THE DRAWINGS

Further objects and advantages of the present invention will be apparent from the following description and claims and are illustrated in the accompanying drawings which, by way of illustration, schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings:

DETAILED DESCRIPTION OF THE PREFERRED EMBODIMENTS

Figure 1:
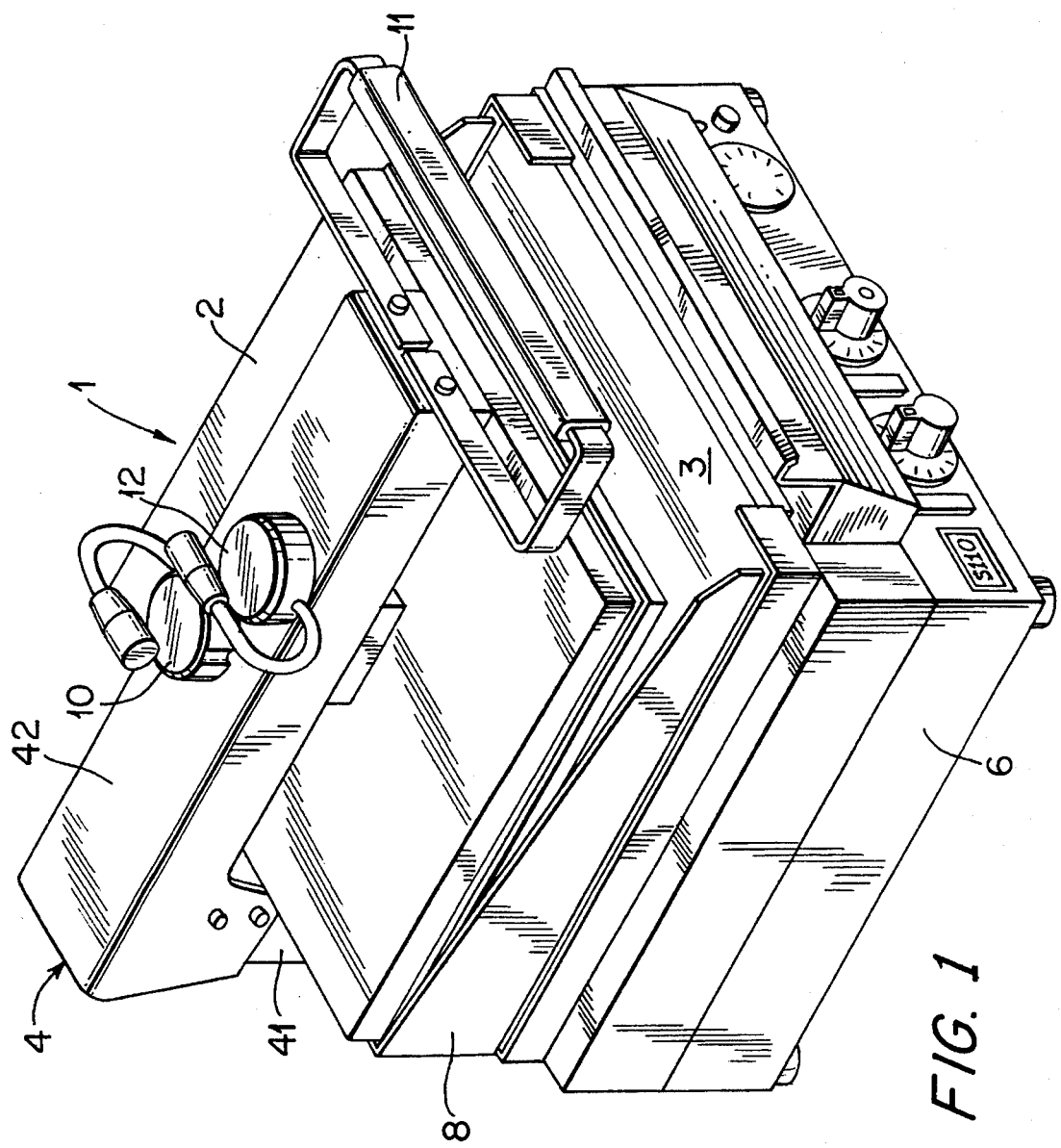
FIG. 1 shows an axonometric representation of a contact grill apparatus according to the invention.

A contact grill apparatus 1 according to the invention and as shown in FIG. 1 comprises a lower contact plate 3, to which an upper contact plate 2 is pivotably joined by means of a central arm 4. The upper contact plate 2 is floatingly mounted in a universal joint 5 (FIG. 2) arranged in the central arm 4. By means of this, the upper contact plate 2 has two degrees of freedom, which allows it to almost completely cover of food pieces to be grilled having different heights. The contact plates 2, 3 are arranged above a structural module 6 containing electrical circuitry, which is not shown in detail. A splash guard 8 is arranged between the contact plates 2, 3. Upper and lower contact plates 2, 3 are formed in the manner of a sandwich plate and have an aluminium core, on which, at least facing towards the actual grilling area, a high-grade steel layer is roller-plated.

The central arm 4 comprises a vertical first central arm portion 41 arranged in the region of the lower contact plate 3 and on which a second central arm portion 42 is pivotably mounted. An operating element 11 is arranged at the free end of the second central arm portion 42 for opening and closing the contact grill apparatus. The central arm 4 furthermore includes a first adjustment knob 10 for a weight or load relieving device 7, 14 (FIG. 2) and a second adjustment knob 12 for a stop limiter 9 (FIG. 2), whereby each adjustment knob 10, 12 can be operated by means of an adjustment lever 13, respectively.

Figure 2:
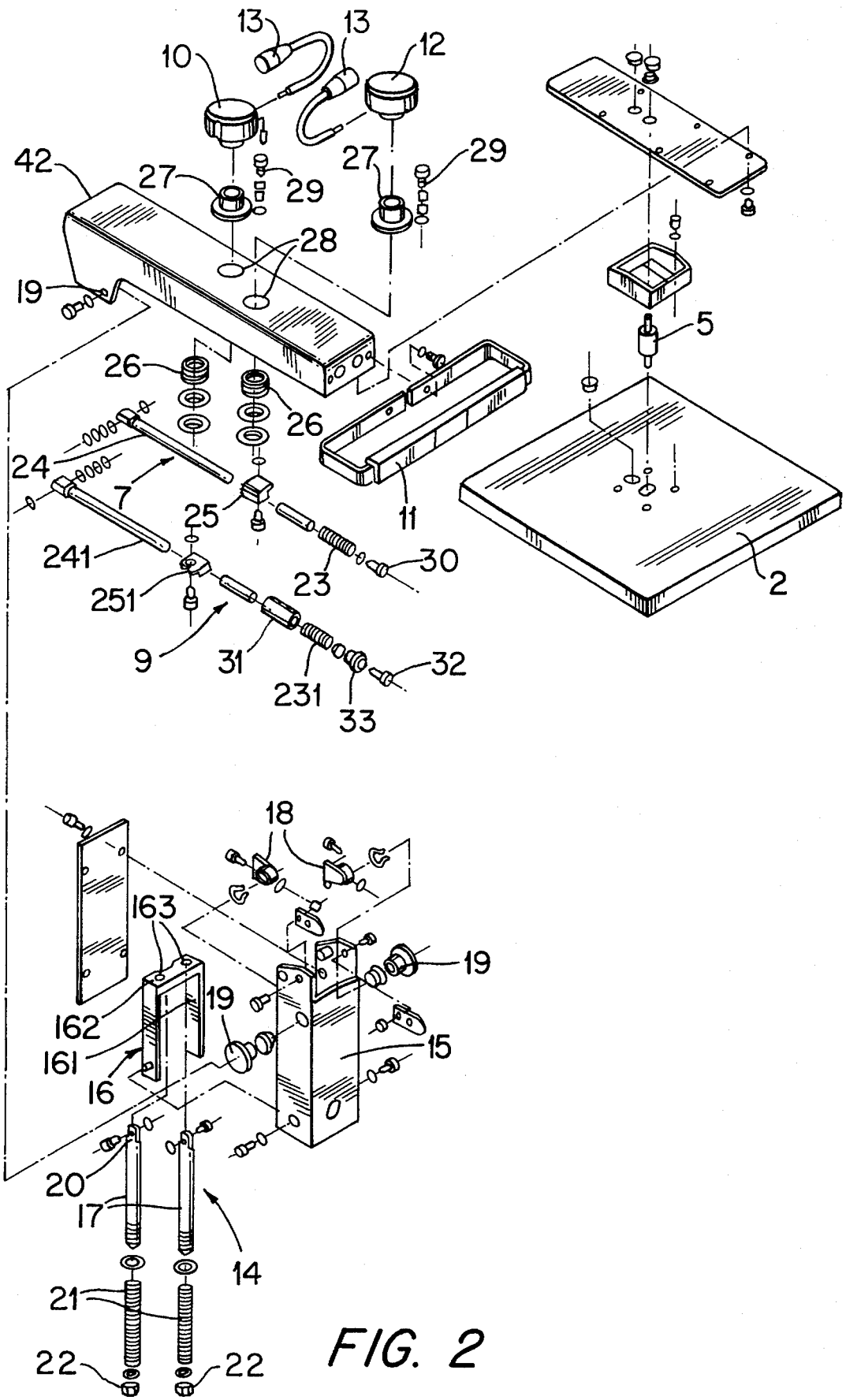
FIG. 2 shows an exploded representation of the components for load relieving devices, stop limiting and mounting of an upper contact grill plate.

The exploded view in FIG. 2 shows the arrangement and operation of the load relieving device 7 and the stop limiter 9 in detail. The contact grill apparatus 1 comprises two different load relieving devices 7, 14. The main load relieving device 14 is arranged in the vertical, fixed central arm portion 41, while the second load relieving device 7 is located in the pivotable central arm portion 42. The fixed central arm portion 41 includes a base frame 15 connected to the base unit or module 6 of the contact grill apparatus 1. A frame 16 is pivotably mounted in this base frame 15, such that its pivot axis is located in the lower region of the base frame 15. The frame 16 comprises two parallel legs 161 connected to one another at their upper edges by a middle piece or web 162. The middle piece 162 is formed with two holes 163, through which two bolts 17 may be inserted. The ends of the bolts 17 which protrude upwards through the middle piece 162 are hingeably connected to two lever arms 18, which are fixedly connected to the pivot axle 19, which defines a pivot axis, of the pivotable central arm portion 42 by means of a radial screw connection. The lever arms 18 are connected to the bolts 17 outside the pivot axis 19, which corresponds to that of the central arm portion 42, and are pivotally guided and screwed in slots 20 in the bolts 17. At the lower parts of the bolts 17, springs 21 (compression springs) are arranged and held by nuts 22. The springs 21 abut the middle portion 162 of the frame 16 and thereby exert a downwardly directed force on the bolts 17. This force acts on the lever arms 18 pivotably arranged in the base frame 15, so that a constant force is exerted on the upper contact plate 2 in an opening direction. The result is a lightening or relieving of the load. The strength of this load relieving depends on the biasing of the springs 21, which can be adjusted by means of the nuts 22. The upper central arm portion 42 is eccentrically hinged on the pivot axle so that a pivotal movement of the central arm portion 42 causes the frame 16 to undergo a slight pivotal movement as well. In the open position of the contact grill apparatus 1, the springs 21 hold the upper contact plate 2 open. It should be stressed that the lever arms 18 are cranked. Thus each lever arm 18 comprises two work arms, having different lengths. The shorter work arm thus operates as the work arm for the spring 21 when the contact grill apparatus is closed. The longer work arm, on the other hand, functions as a work arm when the contact grill apparatus is open. In this way, the opening operation is facilitated.

As mentioned above, the second load relieving device 7 is located in the pivotable portion of the second central arm portion 42. To this end, a rod 24 is mounted outside the pivot axis 19 of the pivotable second central arm portion 42 in the base frame 15 of the fixed first central arm portion 41. A sliding element 25 is arranged on the rod 24 and is connected to the first adjustment knob 10 via a compression spring 26 by means of a screw connection. A bearing bush 27 is arranged between the adjustment knob 10 and the second central arm portion 42. A circle of holes 28 is located around the hole for the second adjusment knob 12, into the individual holes of which a pin of the adjusment knob 10 can lock or catch. On pulling on the adjusment knob 10 the pin is drawn out of the respective hole of the hole circle 28 and locked into another hole by a turning movement. At the same time the sliding element 25 slides along the rod 24. A spring 23 is arranged on the end of the rod 24 lying distal from its mounting and held in place by a stop member 30. The distance between the sliding element 25 and the stop member 30 is at its largest when the contact grill apparatus 1 is open due to the different points of pivot on the rod 24. When the central arm portion 42 is swung downwards, the distance between the sliding element 25 and stop member 30 is reduced until the sliding element 25 comes to rest on the spring 23, depending on the initial setting of the adjustment knob 10, so that a compression force is generated, which opposes the further downward movement of the central arm portion 42 and thus of the upper contact plate 2.

In addition to this load relieving device 7, a stop limiter 9 is also located in the pivotable central arm portion 42. The stop limiter 9 has a similar construction to the adjacently arranged load relieving device 7. The stop is embodied by a spring 231 compressibly mounted in a bushing 31. The stop function is achieved when the bushing 31 hits a sliding element 251 of the stop limiter 9 which is slidably arranged on a rod 241 and an end piece 32 arranged at the end of this rod 241 comes to rest against a spring holder 33 and/or slightly compresses the spring 231, which is mounted in the bushing 31. The desired stop position may also be set by means of the adjustment knob 12, which acts on the sliding element 251 of the rod 241 and can slide the same along the rod 241. The bushing 31 defines only the largest possible extension of the spring 231 mounted therein. The embodiment of this stop limiter 9 as a spring assembly means that pressure may unintentionally be further applied on the upper contact plate 2 in the direction of the lower contact plate 3 after the stop limitation has been reached by the end piece 32 abutting the spring holder 33 of the spring 231 without damaging the components of the stop limiter 9.

The upper contact plate 2 is itself connected to the pivotable part of the second central arm portion 42 via a universal joint 5, such that the plate 2 is effectively floatingly mounted on the universal joint.

Figure 3:
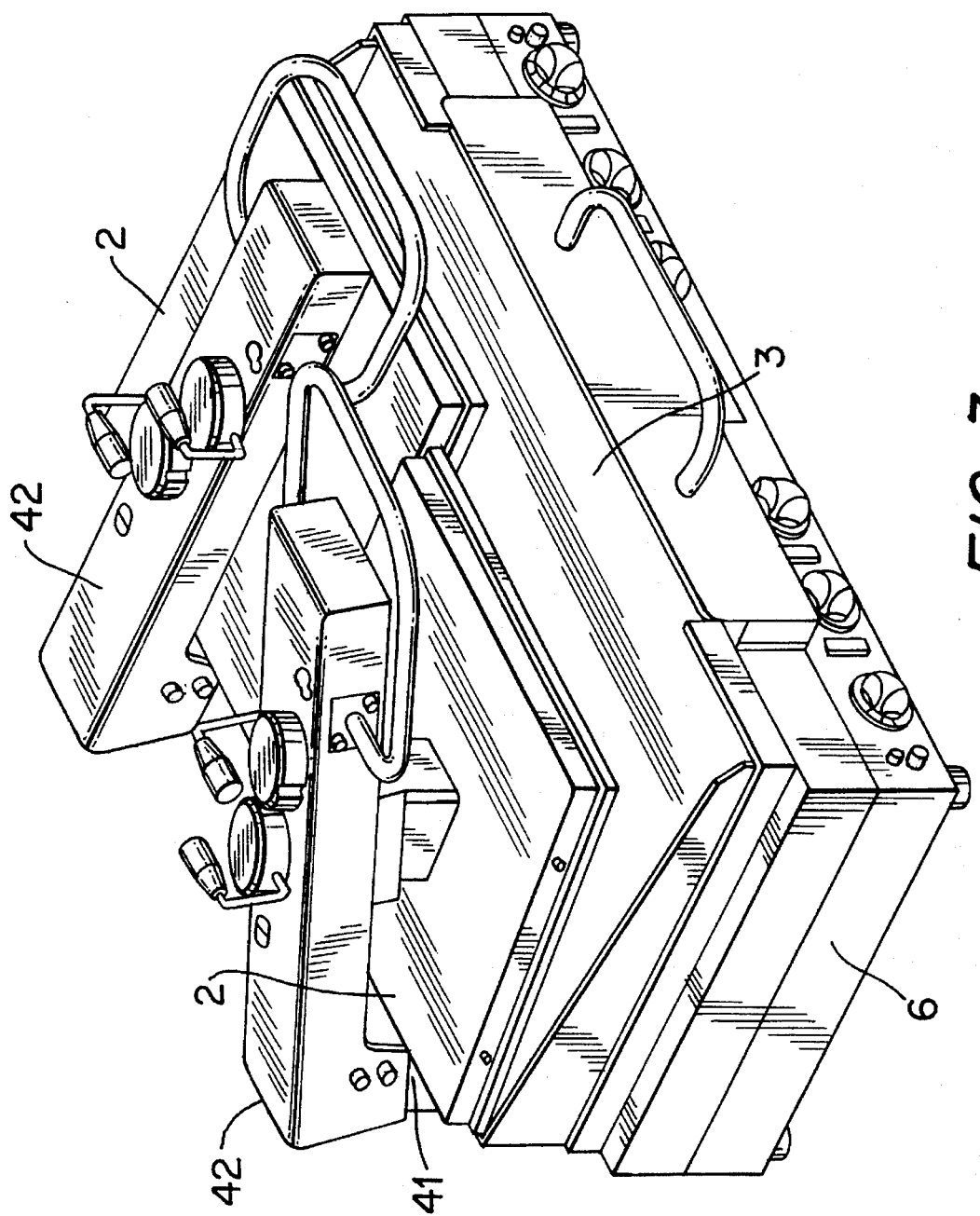
FIG. 3 shows an axonometric representation of a contact grill apparatus according to another embodiment of the invention.

FIG. 3 shows another embodiment of the grill apparatus according to the present invention in which plural upper contact plates 2 are shown.

I claim:

1. An electrical contact grill apparatus for grilling food, comprising:

a fixed lower contact plate and an upper contact plate;

a central arm having a pivot axle, defining a pivot axis, and having an essentially vertical fixed portion and a pivotable portion mounted on said fixed portion, said upper contact plate being arranged on said pivotable central arm portion so as to be movable between a raised position and a lowered position; and first and second adjustable load relieving means for relieving the weight of said upper contact plate, said first load relieving means being arranged in said fixed central arm portion and comprising at least one lever arm, one end of said lever arm being fixed to said pivot axle and pivoting about said pivot axis and the other end being attached to resilient force means including at least one spring, said lever arm being arranged to provide a maximum load relieving effect when the upper contact plate is in said raised position and a minimum load relieving effect when said upper contact plate is in said lowered position, and said second load relieving means being arranged in said pivotable central arm portion to provide a maximum load relieving affect when said upper contact plate is in the lowered position and a minimum load relieving affect when said upper contact plate is in the raised position.

2. An apparatus as claimed in claim 1, wherein said upper contact plate is at least one of movably mounted on and movably mounted in said central arm.

3. An apparatus as claimed in claim 1, wherein said upper contact plate is connected to the central arm by a universal joint.

4. An apparatus as claimed in claim 1, wherein said first load relieving means is a transmission mechanism having coupled structural components.

5. An apparatus as claimed in claim 1, wherein said first load relieving means includes two bolts which operate together with a respective lever arm by a respective spring.

6. An apparatus as claimed in claim 5, wherein each of said lever arms is cranked to form two work arms.

7. An apparatus as claimed in claim 5, wherein each of said lever arms is cranked to form two work arms; and wherein a shorter one of said work arms functions as a work arm for said load relieving springs when the upper contact plate is closed, and a longer one of said work arms functions as a work arm for said load relieving springs when the upper contact plate is open.

8. An apparatus as claimed in claim 1, wherein said pivotable central arm portion comprises first adjustment means, and wherein said second load relieving means is a rod, which is mounted in said base frame so as to lie outside the pivot axis of said central arm, a sliding element connected to said first adjustment means being slidably mounted on said rod and a stop element being arranged at a free end of said rod, whereby said spring is mounted between said sliding element and said stop element.

9. An apparatus as claimed in claim 1, wherein there is further included stop limiting means for defining the minimum spacing between said contact plates.

10. An apparatus as claimed in claim 9, wherein said pivotable central arm portion comprises second adjustment means, and said stop limiting means is a rod mounted in said base frame so as to lie outside the pivot axis of said pivotable central arm portion, a sliding element connected with said second adjustment means being slidably mounted on said rod and a stop element being arranged at a free end of said rod, whereby said spring is mounted in a bushing between said sliding element and said stop element; and wherein displaceable spring holding means are located inside said bushing for defining the longitudinal extension of said spring.

11. An apparatus as claimed in claim 1, wherein said apparatus is formed in a modular fashion.

12. An apparatus as claimed in claim 1, wherein said upper contact plate is arranged to be laterally displaceable with respect to said lower contact plate.

13. An apparatus as claimed in claim 1, wherein said apparatus comprises several upper contact plates.

14. An apparatus as claimed in claim 1, wherein the heated states of individual contact plates are separately controllable.

15. An apparatus as claimed in claim 1, including electrical circuitry for changing the state of said apparatus, said circuitry being arranged in a separate structural module.

16. An apparatus as claimed in claim 15, wherein said structural module is spatially separated from said contact plates.

17. An apparatus as claimed in claim 1, wherein the contact plate temperature is electronically controlled.

18. An apparatus as claimed in claim 1, wherein said upper contact plate is a radiation plate for non-contact grilling or warming food.

19. An apparatus as claimed in claim 1, wherein at least one of said contact plates comprises an aluminum core and has an external high-grade steel layer on a surface for directing heat towards said food.

20. An apparatus as claimed in claim 19, wherein said high-grade steel layer is roller-plated on said core.

21. An electrical contact grill apparatus for grilling food, comprising:

a fixed lower contact plate and an upper contact plate pivotably arranged on a central arm, wherein said upper contact plate is pivotable with respect to said lower contact plate;

first and second load relieving means for acting on said upper contact plate in a load relieving manner each by at least one spring thereof, respectively;

wherein said central arm further comprises a pivotable portion, and wherein said second load relieving means is arranged in said pivotable central arm portion; and wherein said central arm has a pivot axle, which defines a pivot axis, about which said pivotable portion of said central arm can be pivoted, and said first load relieving means comprises at least one lever arm, which is fixed to and pivotable with said pivot axle, said fixed central arm portion comprising a base frame having a frame hingedly arranged therein which includes a middle piece, and wherein an end of said at least one lever arm located distal from said pivot axis is arranged to cooperate with a bolt, said bolt having a nut arranged at an end of said bolt lying distal from said pivot axis and being mounted in said frame with a spring arranged compressed between said middle piece and said nut.

22. An apparatus as claimed in claim 21, wherein each of said at least one lever arm is cranked to form two work arms; and wherein said two work arms have different lengths.

23. An apparatus as claimed in claim 22, wherein said pivotable central arm portion comprises first adjustment means, and wherein said second load relieving means is a rod, which is mounted in said base frame so as to lie outside the pivot axis of said central arm, a sliding element connected to said first adjustment means being slidably mounted on said rod and a stop element being arranged at a free end of said rod, whereby said spring is mounted between said sliding element and said stop element; and wherein said first adjustment means includes a knob which defines a central axis, and said sliding element is connected to said knob outside of said central axis, so that on adjusting said knob said sliding element can slide along said rod.

24. An apparatus as claimed in claim 23, wherein there is further included stop limiting means for defining the minimum spacing between said contact plates; and wherein said pivotable central arm portion comprises second adjustment means, and said stop limiting means is a rod mounted in said base frame so as to lie outside the pivot axis of said pivotable central arm portion, a sliding element connected with said second adjustment means being slidably mounted on said rod and a stop element being arranged at a free end of said rod, whereby said spring is mounted in a bushing between said sliding element and said stop element.

25. An electrical contact grill apparatus for grilling food, comprising:

- a fixed lower contact plate and an upper contact plate pivotably arranged on a central arm, wherein said upper contact plate is pivotable with respect to said lower contact plate;
- first and second load relieving means for acting on said upper contact plate in a load relieving manner each by at least one spring thereof, respectively;
- wherein said central arm includes a pivotable portion and a pivot axle, wherein said pivotable central arm portion comprises first adjustment means, and wherein said second load relieving means is a rod, which is mounted in said base frame so as to lie outside the pivot axle of said central arm, a sliding element connected to said first adjustment means being slidably mounted on said rod and a stop element being arranged at a free end of said rod, whereby said spring is mounted between said sliding element and said stop element;
- wherein there is further included stop limiting means for defining the minimum spacing between said contact plates; and
- wherein said stop limiting means is adjustable and arranged in said pivotable central arm portion.

* * * * *